United States Patent
Zeller et al.

(10) Patent No.: US 6,282,662 B1
(45) Date of Patent: *Aug. 28, 2001

(54) POWER MANAGEMENT OVERRIDE FOR PORTABLE COMPUTERS

(75) Inventors: Charles Zeller, Austin; James L. Walker, Cedar Park, both of TX (US)

(73) Assignee: Dell USA, L.P., Round Rock, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/562,360

(22) Filed: Aug. 4, 1995

(51) Int. Cl.[7] .......................................... G06F 1/26
(52) U.S. Cl. ........................... 713/300; 713/320; 713/324
(58) Field of Search ..................................... 713/300, 320, 713/322, 323, 324, 330, 340; 365/226, 227

(56) References Cited

U.S. PATENT DOCUMENTS

| 5,218,704 | * | 6/1993 | Watts, Jr. et al. ................... 713/340 |
| 5,276,680 | * | 1/1994 | Messenger .......................... 370/85.1 |
| 5,694,607 | * | 12/1997 | Dunstan et al. .................... 713/340 |

* cited by examiner

*Primary Examiner*—Ario Etienne
(74) *Attorney, Agent, or Firm*—Haynes and Boone, L.L.P.

(57) ABSTRACT

Method and apparatus for selectively overriding a prepackaged power management driver of a portable personal computer so that data transmitted to the CPIU of the computer by a device, such as a "real time" serial communicators device connected thereto, is not lost during the CPUs latency "wake up" period following a CPU power-down operation. An override system stored in memory comprises an override flag which may be set or cleared by a user or the computer. If the override flag is set, then the power management system is prevented from reducing power to the CPU so that the occurrence of a CPU latency period and thus potential for loss of data is avoided.

17 Claims, 1 Drawing Sheet

POWER MANAGEMENT OVERRIDE FOR PORTABLE COMPUTERS

TECHNICAL FIELD

The invention relates generally to power management systems for personal computers and, more particularly, to a method and apparatus for overriding selected aspects of such power management systems.

BACKGROUND OF THE INVENTION

Portable personal computers (PCs) were first introduced in the early 1980s and have since enjoyed great commercial success and consumer acceptance. As the portable PC market has grown, users have begun to demand lighter weight, lower volume PCs which can be used for longer periods of time between battery charges. Meeting these demands has proved challenging in view of the fact that most portable PCs now support peripheral devices previously available only on desktop PCs. The additional peripherals greatly increase overall power consumption, making it difficult to achieve an optimal level of functionality while maintaining an acceptable battery life. Furthermore, it has also become desirable to more efficiently manage the power consumption of non-battery powered desktop PCs in order to minimize overall operating costs.

One solution has been to design into the computer's basic input/output system (BIOS) a pre-packaged power management routine, or to load into the computer's operating system (OS) a pre-packaged driver, such as the Microsoft™/Intel™ Advanced Power Management (APM) driver, that regulates the application of power to certain devices by placing such devices in an "idle" state when demand for such devices is low. For example, when die central processing unit (CPU) is not executing a program, its power consumption can be reduced considerably by decreasing the speed at which it operates. Further examples include turning off the LCD backlight or blanking the monitor screen after a period of keyboard inactivity and stopping the hard-disk drive motor after the drive has not been accessed for a preset internal of time.

Once the power to the CPU, an I/O device, or other peripheral device is reduced the device can be powered back up if there is a demand for that device. The device though does not "wake up," i.e., regain its full capabilities, instantly, but rather requires a finite amount of time, or "latency," to do so.

A problem with power management systems, as they are currently available, is that important data may be lost during the latency of the CPU when data is initially transmitted to it Specifically, such a loss of data can result when the CPU is connected to critical, "real-time" devices such as serial peripheral I/O devices, including instrumentation interfaces, modems, and PCMCIA controllers, that transmit data serially to the CPU. These devices typically include a buffer for storing a limited number of bytes of data to be transmitted to the CPU. Once the buffer is full, the stored bytes are overwritten by new incoming bytes of data It can be appreciated that bytes of data can thus be stored in the buffer for only a limited amount of time, and if that time is less than the latency of the CPU, then data will be lost.

The latency problem may be avoided by selectively disabling the computer's power management system. Most conventional power management systems, prepackaged with available computer operating systems, have the capability to selectively enable and disable their power management functions. However, this defeats the purpose of the power management system because all devices would then utilize full power and the user would forfeit the advantages of power management. While some such systems can be operated by the user to selectively disable only certain devices, many do not have this capability and, in particularly, cannot be operated to disable power management functions with respect to the CPU only, while remaining enabled for the other devices.

What is needed, therefore, is a system for overriding, the operation of a computer's prepackaged power management system that disables power management functions of the CPU only, without disabling power management for other devices, to thereby solve the CPU latency problem when a power managed computer is operated in connection with serial data devices.

SUMMARY OF THE INVENTION

The foregoing problems are solved and a technical advance is achieved by a system and method for selectively disabling the existing power management functions of a computer with respect to the CPU only, without disabling the other power management functions of the computer, so that the CPU does not experience latency in being reactivated to receive data transmitted from a device connected thereto. In a departure from the art, a power management override system is stored in the computer's memory that controls a CPU idle override flag. If set, the flag prevents the power management system of the computer from reducing the power to the CPU.

In a preferred embodiment, a system is disclosed for managing the power efficiency of a computer having a memory, a processor, and one or more power consuming devices; wherein the computer is to be operatively connected to a critical input/output (I/O) device requiring the processor to be fully powered when transmitting data to the processor. The system comprises a power management system stored in the memory for selectively controlling the power consumption of the processor and the power consuming devices between operation in full power and reduced power consumption states.

The system further comprises an override system stored in the memory for overriding the power management system to prevent the processor from being operated in the reduced power consumption stare yet without preventing the power consuming devices from being operated in the reduced power consumption state. The power management override system includes a CPU idle override flag which may be set or cleared to enable or disable, respectively, the power management system. If the override flag is clear, then the override system is disabled, thereby permitting the power management system to execute instructions for reducing power to the CPU. If, however, the override flag is set, then the override system is enabled and the power management system is prevented from executive instructions for reducing power to the CPU. In a first aspect of the present invention, a user may selectively enable or disable the overriding by setting or clearing, respectively, the override flag. In a second aspect of the invention, the processor may selectively enable the overriding automatically by setting the override flag when the critical I/O device is actively connected to the computer, and disable it otherwise.

A technical advantage achieved with the present invention is that, because the power management of the CPU can be selectively disabled, the CPU can be prevented from experiencing a CPU latency or "wake up" period, thereby avoiding the problem of losing data that may have been transmitted during that period.

Another technical advantage achieved with the invention is that power management of the CPU may be selectively disabled without shutting down the entire computer system or disabling power management to other system devices.

Yet another technical advantage achieved with the invention is that it is operable without requiring that pre-packaged power management driver code be rewritten or even modified. Accordingly, the present invention is readily adaptable for use with a number of different prepackaged power management drivers.

DETAILED DESCRIPTION OF THE PREFERRED EMBODIMENT

Figure 1:
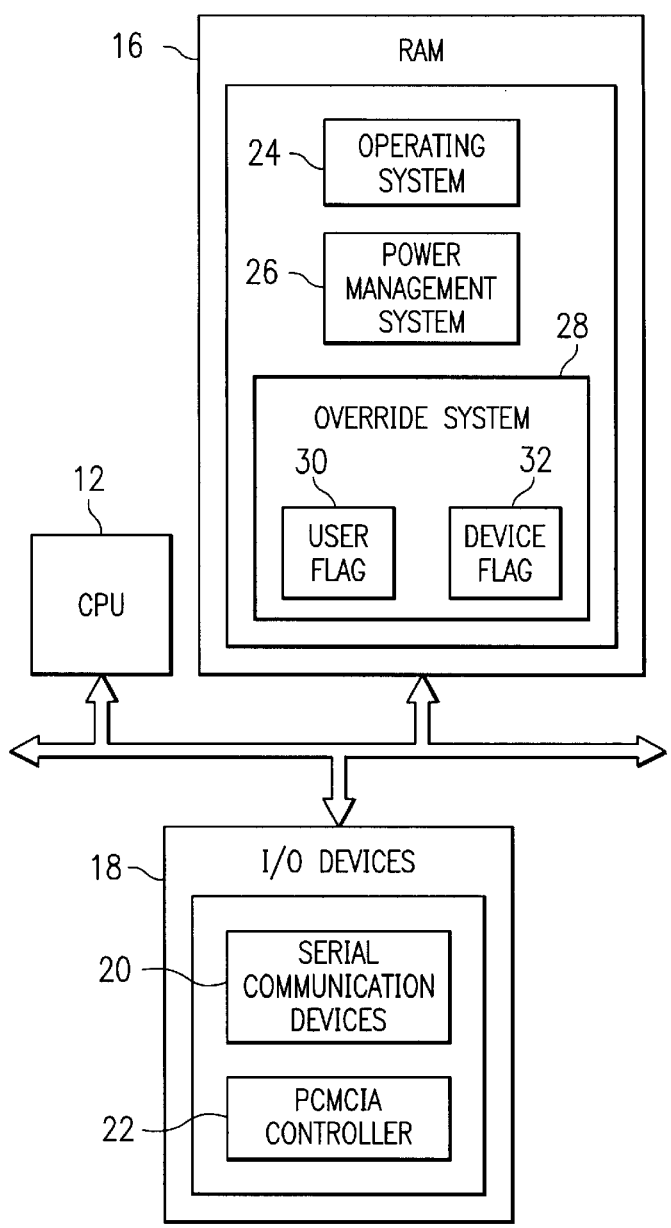
FIG. 1 is a functional block diagram of a personal computer embodying features of the power management override system of the present invention.

FIG. 1 is a functional block diagram of a personal computer (PC) 10 embodying features of the present invention. The PC 10 comprises a central processing unit (CPU) 12 connected via a host bus 14 to a system RAM 16 and a number of I/O devices collectively designated by the reference numeral 18. The I/O devices 18 may include for example, serial communication devices 20, PCMCIA controllers 22, a display (not shown), a keyboard (not shown), a disk drive (not shown), and a pointing device such as a mouse (not shown). The PC 10 further includes an operating system (OS) 24 which is stored in the system RAM 16. A power management system providing standard power management routines such the Microsoft/Intel APM driver, designated by the reference numeral 26, is also stored in the RAM 16.

According to the invention, a power management system override system 28 is stored in the RAM 16. The system 28 includes a user flag 30 and a system flag 32, for reasons discussed in detail below. As explained below, the system 28 is used to override the power management system 26 so that power management functions are disabled with respect to the CPU 12 only, but not disabled with respect to other power-managed devices.

Figure 2:
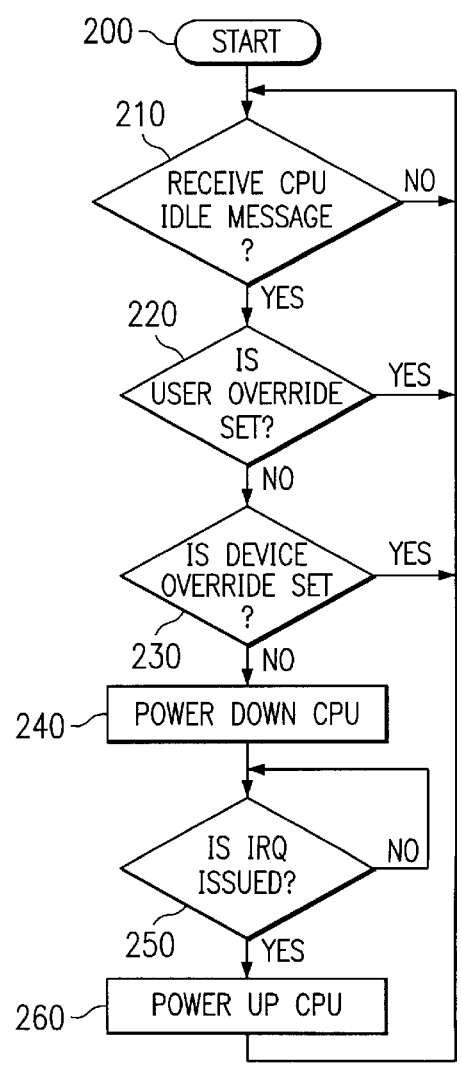
FIG. 2 is a flowchart of the logic implemented by the power management override system in the system of FIG. 1.

FIG. 2 illustrates a flowchart of the operation of the system 28. Execution automatically begins at step 200 upon initiation of the operating system 24 of the PC 10. In step 210, a determination is made whether the power management system 26 has issued an instruction to place the CPU 12 in an idle state, i.e., to "power down" the CPU. Typically, the power management system 26 will issue such an instruction when there is a predetermined period of CPU 12 inactivity, for instance when the CPU is not executing a program and may be powered down to an "idle" state. If, in step 210, a CPU idle instruction has not been issued, execution remains at step 210. If, in step 210, a CPU idle instruction has been issued, execution proceeds to step 220.

In step 220, the override system 28 determines whether the user override flag 30 is set or is cleared. The user may set or clear the override flag 30 using conventional computer interface techniques. If, in step 220, the user override flag 30 has been set, execution returns to step 210. If, in step 220, the user override flag 30 has not been set, i.e., it is clear, execution proceeds to step 230.

In step 230, the override system 28 determines whether the device override flag 32 is set or is cleared. The device override flag 32 is cleared under normal operating conditions of the operating system 24. However, the flag 32 is set if a "critical" device is activated on the system. As used here, a "critical" device is any device which may require service of an event by the CPU 12 during the CPU's latency "wake up" period wherein loss of such data due to the latency would be unacceptable. Examples of such critical devices include one or more serial communications devices 20 and the PCMCIA controller 22. If, in step 230, the device override flag 32 has been set, execution returns to step 210. If, in step 230, the device override flag 32 has not been set, i.e., it is clear, execution proceeds to step 240 in which power to the CPU 12 is reduced or even removed totally. This is accomplished in a conventional manner such as by controlling the CPU clock speed.

In step 250, the override system 28 determines whether an interrupt request (IRQ) has been issued to the CPU 12. If, in step 250, an IRQ is not issued, execution remains at step 250. If, in step 250, an IRQ is issued, execution proceeds to step 260 in which the CPU is powered up for operation, and execution then returns to step 210.

It is understood that the present invention can take many forms and embodiments. The embodiments shown herein are intended to illustrate rather than to limit the invention, it being appreciated that variations may be made without departing from the spirit or the scope of the invention. For example, an override system similar to the system 28 described herein could be implemented for non-CPU devices of the PC 10, such as the hard disk drive. In addition, other criteria, such as time of inactivity, could be used to set or clear the device flag 32.

Although illustrative embodiments of the invention have been shown and described, a wide range of modification, change and substitution is intended in the foregoing disclosure and in some instances some features of the present invention may be employed without a corresponding use of the other features. Accordingly, it is appropriate that the appended claims be construed broadly and in a manner consistent with the scope of the invention.

What is claimed is:

1. A system for managing the power efficiently of a computer having a memory, a processor and one or more power consuming devices, said computer to be operatively connected to a critical input/output (I/O) device requiring said processor to be fully powered when transmitting data to said processor, the system comprising:

the critical device coupled to the processor for service of an event by the processor;

a power management system stored in said memory for selectively controlling the power consumption of said processor and said power consuming devices between operation in full power and reduced power consumption states; and an override system coupled to determine whether an interrupt request has been issued to request a power up to the processor, the override system being stored in said memory for overriding said power management system to disable power management functions with respect to the processor only, without disabling power management with respect to the power consuming devices.

2. The system of claim 1 wherein said overriding is enabled or disabled at the selection of a user.

3. The system of claim 1 wherein said overriding is enabled automatically when said critical I/O device is actively connected to said computer and otherwise is disabled.

4. The system of claim 1 wherein said override system comprises:
   an override flag stored in said memory, which flag may be set or cleared;
   means for determining whether said power management system has issued an instruction for reducing power to said processor;
   means responsive to a determination that said instruction for reducing power has been issued for determining whether said override flag has been set;
   means responsive to a determination that said override flag has been set for preventing execution of said instruction for reducing power to said processor; and
   means responsive to a determination that said override flag has not been set for permitting execution of said instruction for reducing power to said processor.

5. The system of claim 1 wherein said critical I/O device is a data communication device.

6. The system of claim 1 wherein said critical I/O device is a PCMCIA controller.

7. A method for managing the power efficiency of a computer having a memory, a processor and one or more power consuming devices, said computer to be operatively connected to a critical input/output device requiring said processor to be fully powered when transmitting data to said processor, the system comprising:
   coupling the critical device to the processor for servicing of an event by the processor;
   selectively controlling the power consumption of said processor and said power consuming devices between operation in full power and reduced power consumption states;
   coupling an override system to determine whether an interrupt request has been issued to request a power up of the processor; and
   overriding said controlling to disable power management functions with respect to the processor only, without disabling power management with respect to the power consuming devices.

8. The method of claim 7 wherein said overriding is enabled or disabled at the selection of a user.

9. The method of claim 7 further comprising:
   determining whether said critical I/O device is actively connected to said computer:
      responsive to a determination that said critical I/O device is actively connected to said computer, automatically enabling said overriding: and
      responsive to a determination that said critical I/O device is not actively connected to said computer, automatically disabling said overriding.

10. The method of claim 7 wherein said overriding comprises:
   determining whether said power management system has issued an instruction for reducing power to said processor:
   responsive to a determination that said instruction for reducing power has been issued, determining whether an override flag has been set;
   responsive to a determination that said override flag has been set, preventing execution of said instruction for reducing power to said processor, and
   responsive to a determination that said override flag has not been set, permitting execution of said instruction for reducing power to said processor.

11. A method for selectively preventing a power management (PM) system stored in the memory of a computer from reducing power to a processor of said computer, while permitting said PM system to manage power to at least one other device in said computer, the method comprising:
   coupling the at least one other device to the processor for servicing of an event by the processor;
   storing in said memory at least one override flag which may be set or cleared;
   determining whether said PM system has issued an instruction for reducing power to said processor;
   coupling the at least one override flag to determine whether an interrupt request has been issued to request a power up of the processor;
   responsive to a determination that said instruction has been issued, determining, for each said at least one override flag, whether said at least one override flag has been set;
   responsive to a determination that one of said at least one override flag has been set, overriding said instruction thereby preventing power to said processor from being reduced; and
   responsive to a determination that none of said at least one override flag has been set, permitting power only to said processor to be reduced without disabling power management with respect to the at least one other device.

12. The method of claim 11 wherein said at least one flag comprises a first flag that may be set or cleared by a user.

13. The method of claim 11 wherein said at least one flag comprises a second flag that may be set or cleared by said processor, and the method further comprises determining whether a selected peripheral device is electrically connected to said processor and, responsive to a determination that a selected peripheral device is electrically connected to said processor, setting said second flag and, responsive to a determination that a selected peripheral device is not electrically connected to said processor, clearing said second flag.

14. The method of claim 13 wherein said selected device is a communication device.

15. The method of claim 13 wherein said selected device is a serial data communication device.

16. The method of claim 13 wherein said selected device is a PCMCIA controller.

17. A computer system comprising:
   a CPU connected to a system RAM and a plurality of I/O devices;
   an operating system stored in the RAM;
   a power management system stored in the RAM;
   a power management override system stored in the RAM, the override system including a user flag and a system flag, and operable to override the power management system to disable power management functions with respect to the CPU only, without disabling power management functions with respect to the I/O devices.

* * * * *